N. C. JOHNSON.
GARBAGE INCINERATOR.
APPLICATION FILED NOV. 20, 1916.
1,257,359.
Patented Feb. 26, 1918.
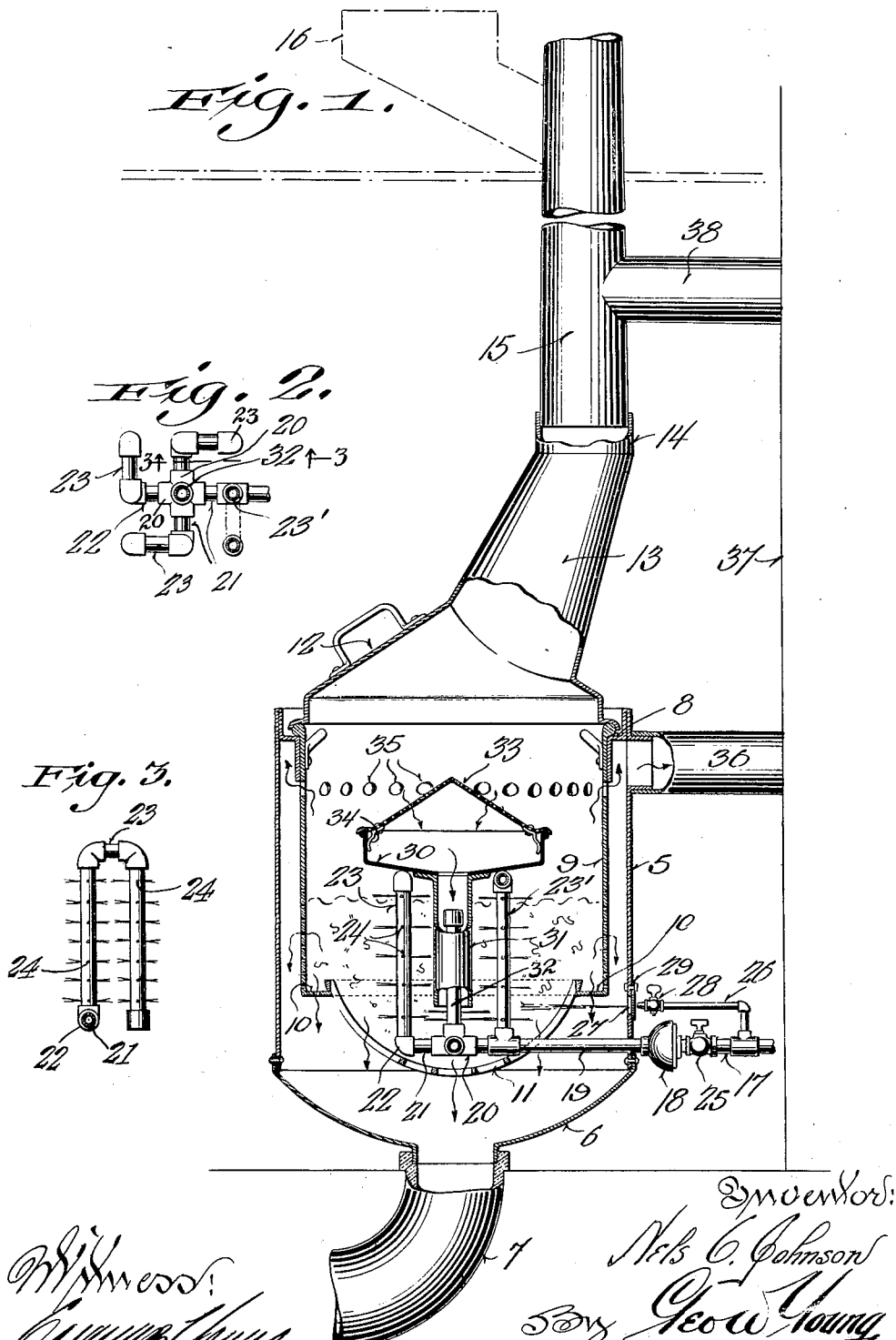

UNITED STATES PATENT OFFICE.

NELS C. JOHNSON, OF RACINE, WISCONSIN.

GARBAGE-INCINERATOR.

1,257,359.　　　　　Specification of Letters Patent.　　Patented Feb. 26, 1918.

Application filed November 20, 1916.  Serial No. 132,321.

*To all whom it may concern:*

Be it known that I, NELS C. JOHNSON, a citizen of the United States, and resident of Racine, in the county of Racine and State of Wisconsin, have invented certain new and useful Improvements in Garbage-Incinerators; and I do hereby declare that the following is a full, clear, and exact description thereof.

The present invention relates to new and useful improvements in garbage disposal apparatus of that type comprising a container connected with a suitable chute for discharge thereinto of garbage and the like, and in which is disposed suitable burner means for procuring combustion of garbage.

It is in general the object of my invention to simplify and otherwise improve the structure and to increase the efficiency and convenience of operation of apparatus of this character.

Most specifically, an important object resides in the provision of means for procuring a ready drainage of garbage in the container and for setting up a flow of air adjacent the garbage whereby to remove moisture therefrom, to render it more readily combustible.

A further object in connection with the drainage of the garbage resides in the provision of a drain member adapted to convey liquid from the container upon its discharge thereinto, to prevent further wetting of the garbage already in the container, this drain member serving also as a shield for a burner disposed in the container.

A still further important object resides in the provision of a garbage disposal apparatus including an incinerator container having its parts arranged for ready assembly and disassembly and including an inner receptacle whereby garbage may be readily removed from the container in such instances as when it is not desired to utilize said container as an incinerator.

With the above and other objects and advantages in view, the invention resides more particularly in the novel combination, formation and arrangement of parts hereinafter described and particularly pointed out in the appended claims.

In the drawings:

Figure 1 is a vertical sectional view through the container of a garbage disposal apparatus constructed in accordance with the present invention, certain parts thereof being omitted for the convenience of illustration.

Fig. 2 is a semi-diagrammatic plan view of the burner member, with portions thereof broken away and in section to more clearly disclose the structure.

Fig. 3 is a detail vertical sectional view taken substantially on the plane of the line 3—3 of Fig. 2.

Referring more particularly to the accompanying drawings, the present embodiment of my invention comprises an outer vertical cylindrical casing 5 having a bowl shaped bottom 6 from which extends a sewer drain pipe 7. Adjacent its top, the casing is provided with an inturned annular flange 8 on which seats the beaded mouth portion of a garbage receptacle 9 disposed within the casing and of lesser diameter whereby an annular air space is provided. The lower portion of the receptacle is foraminous to permit a free draft of air therethrough, and seated at its edge portions on the inturned flange 10 at the open bottom of the receptacle is a bowl shaped grate 11. A cover 12 is provided for the receptacle and has extending angularly therefrom a chute member 13 of inverted funnel shape having at its upper end a vertical neck 14 telescopically receiving the lower end of a chute 15 which is adapted to receive garbage either directly from a kitchen sink, in which instance it is connected to the normal outlet thereof as disclosed in Patent No. 1,203,743, granted to me November 7, 1916, or from a suitable hopper indicated at 16.

It is obvious that in apartment buildings or the like, a number of these hoppers or other receiving means could be associated with a single chute 15.

The offset relation of the cover 12 to the chute by reason of the portion 13, permits said cover being rotated to a desired retracted position upon lifting it above the outer casing 5, and without procuring detachment of the cover from the chute.

Thus the receptacle 9 may be readily removed from the casing 5, to dump the garbage therefrom when it is not desired to burn the garbage in the apparatus. It is appreciated that when the usual furnace fires are maintained in a residence, burning the garbage in the furnace would be a more economical means of disposal.

The burner means normally provided for the garbage comprises a supply pipe 17, disposed longitudinally in a plane between the bottom of the receptacle 9 and the bottom of the grate and terminating adjacent the outer casing 5. Detachably connected with the pipe 17, preferably by a conventional mixing head 18, is a pipe 19 which extends through the wall of the casing 5 and into the grate. Secured on the inner end of the pipe 19 is a coupling head 20 from which radiate short pipe lengths 21, each connected by an elbow 22 with one leg of a pipe line 23 of preferably inverted U-shape, which comprises elbow connected pipe sections. A similar pipe line 23' has one leg connected to pipe 19 adjacent to the head, and the legs of all the pipe lines are provided with series of jet apertures 24 whereby a regularly spaced series of burners is provided. The supply pipe 17 is provided with a suitable valve 25, and for lighting the burners within the container, a jet pipe 26 is branched from the pipe 17 and is adapted to discharge through an opening 27 in the casing 5, this pipe being controlled by a suitable valve 28 and the opening 27 being normally closed by a swinging plate 29, whereby escape of gases from the container is prevented.

For shielding the burners from direct engagement of garbage discharged through the chute, and for also providing an initial drainage means for the garbage, a pan shaped member 30 is provided having a depending discharge neck 31. The member 30 seats on the bight portions of the U-shaped burner members and to prevent its lateral displacement, the coupling head 20 carries an upstanding closed guide pipe 32 which is inserted in the neck 31. A foraminous cover 33 of inverted V-shape in cross section is provided for the pan-shaped member and carries depending spring fingers 34 engaging the inner periphery of the wall of the pan shaped member, whereby it is normally held thereon.

Thus as garbage is discharged into the container, it will fall on the cover 33, and will be deflected therefrom, and conveyed into the bottom of the receptacle, the surplus moisture thereof and other fluid which may be discharged into the container passing through the cover and through the depending neck of the pan-shaped member. Thus the garbage already disposed in the receptacle is prevented from excessive re-wetting, upon subsequent discharge of waste matter into the container.

For providing a flow of air in the container to support combustion and to remove moisture from the garbage, the receptacle is provided adjacent its upper end with an annular series of openings 35, and below the receptacle seating flange 8, of the casing 5, a flue 36 extends from the casing to the chimney 37. A second flue 38 also preferably connects the lower portion of the chute with the chimney and serves to convey gases which might not be conveyed by the flue 36 in such instances as when a strong draft would not exist in the chimney. Air is supplied to the container from the chute 15, and inasmuch as a continuous current of air would be set up through the container and the chimney, possible escape of noxious fumes from the chute is prevented.

In operation successive deposits of garbage would be discharged into the container through the chute, and upon a sufficient accumulation, the burners 23 would be lighted to dry and partly burn the garbage. Upon the garbage being thoroughly dried, the burners would be extinguished and the garbage would support its own combustion, until entirely consumed, it being appreciated that by the constant flow of air set up, the garbage would be normally in a partially dried condition.

An exceedingly simple and readily manipulated garbage disposal apparatus has thus been provided, which may be readily disassembled for repair or cleaning.

What is claimed is:

1. A garbage disposal apparatus comprising an outer casing, a drain for the outer casing, a receptacle disposed in the outer casing and spaced from the walls thereof, a feed chute communicating with the receptacle, a draft flue extending from the casing, a series of burners in the lower portion of the receptacle, and a hollow deflector member disposed above and shielding the burners, the top wall of said member being foraminous, said member having a depending drain neck.

2. A garbage disposal apparatus comprising an outer casing, a drain for the outer casing, a receptacle disposed in the outer casing, a feed chute communicating with the receptacle, a burner supply pipe extending into the casing, upstanding burner members connected with said pipe, and a covered drain member resting on the upstanding burner members, the latter forming a support therefor, the cover of said drain member being adapted to initially separate the liquid and solid portions of the garbage as the latter strikes the same, the other portion of the drain member directing said liquid toward the bottom of the receptacle.

3. A garbage disposal apparatus comprising an outer casing, a drain for the outer casing, a receptacle disposed in the outer casing, a draft flue extending from the casing, a burner supply pipe extending through the casing into the lower portion of the receptacle, upstanding burner members communicating with said pipe, a pan shaped drain member seated on said burner members, said drain member being provided with a foraminous conical cover, and a feed chute communicating with the receptacle above said drain member, the cover of said drain member being adapted to initially drain the liquid from the garbage as it strikes the same.

4. A garbage disposal apparatus comprising an outer casing, a drain for the outer casing, a receptacle disposed in the outer casing, a draft flue extending from the casing, a burner supply pipe extending through the casing into the lower part of the receptacle, upstanding burner members communicating with said pipe, a covered pan-shaped drain member seated on said burner members, said drain member having a depending neck, a feed chute communicating with the receptacle above said drain member, the cover on said drain member being adapted to initially drain the liquid from the garbage as it strikes the same, the neck of said drain member directing said liquid toward the drain of the casing.

5. A garbage disposal apparatus comprising an outer casing, a drain for the outer casing, a receptacle disposed in the outer casing, a draft flue extending from the casing, a burner supply pipe extending through the casing into the lower portion of the receptacle and branched in the receptacle, upstanding burner members carried by said branches, an upstanding guide on the supply pipe, a covered pan-shaped drain member seated on said burners, said member having a depending neck engaging said guide, and a feed chute communicating with the receptacle above said drain member, the cover of said drain member being adapted to initially drain the liquid from the garbage as it strikes the same, the neck of the drain member directing said liquid toward the drain in the casing.

6. A garbage disposal apparatus comprising a receptacle, a burner supply pipe extending thereinto, upstanding burner members communicating with said pipe, and a hollow drain member seated on said burner members, said drain member being provided with a conical foraminous cover, said cover being adapted to initially drain the liquid from the garbage as it strikes the same.

In testimony that I claim the foregoing I have hereunto set my hand at Milwaukee, in the county of Milwaukee and State of Wisconsin.

NELS C. JOHNSON.